(12) United States Patent
Haimerl

(10) Patent No.: US 10,843,543 B2
(45) Date of Patent: Nov. 24, 2020

(54) VEHICLE CONSTRUCTION HAVING A RIGID TOP ELEMENT AND A REAR WINDOW THAT CAN BE OPENED

(71) Applicant: Webasto SE, Stockdorf (DE)

(72) Inventor: Alexander Haimerl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 55 days.

(21) Appl. No.: 16/211,528

(22) Filed: Dec. 6, 2018

(65) Prior Publication Data
US 2019/0176597 A1 Jun. 13, 2019

(30) Foreign Application Priority Data

Dec. 11, 2017 (DE) .......................... 10 2017 129 415
Jul. 19, 2018 (DE) .......................... 10 2018 117 521

(51) Int. Cl.
| | |
|---|---|
| *B60J 7/14* | (2006.01) |
| *B60J 7/047* | (2006.01) |
| *B60J 1/18* | (2006.01) |
| *B60J 1/00* | (2006.01) |
| *B60J 10/90* | (2016.01) |
| *B60J 7/12* | (2006.01) |
| *B60J 10/70* | (2016.01) |

(52) U.S. Cl.
CPC .............. *B60J 7/146* (2013.01); *B60J 1/007* (2013.01); *B60J 1/1807* (2013.01); *B60J 1/1884* (2013.01); *B60J 7/047* (2013.01); *B60J 7/1291* (2013.01); *B60J 10/70* (2016.02); *B60J 10/90* (2016.02)

(58) Field of Classification Search
CPC ........ B60J 1/007; B60J 1/1807; B60J 1/1823; B60J 1/1884; B60J 7/047; B60J 7/1291; B60J 7/143; B60J 7/146; B60J 10/70
USPC ............... 296/107.04, 107.07, 107.2, 220.01
See application file for complete search history.

(56) References Cited

U.S. PATENT DOCUMENTS

| | | | | |
|---|---|---|---|---|
| 2,785,922 A | * | 3/1957 | Chika ...................... | B60J 1/183 296/107.2 |
| 5,738,405 A | * | 4/1998 | Richters ................... | B60J 1/085 296/146.15 |
| 6,623,064 B2 | * | 9/2003 | Schutt .................... | B60J 7/0053 296/108 |
| 7,367,615 B1 | * | 5/2008 | Fallis, III ................... | B60J 1/17 296/216.01 |
| 8,408,623 B1 | * | 4/2013 | McAuliff ................... | B60J 7/11 296/210 |
| 9,186,960 B2 | * | 11/2015 | Bowles .................. | B60J 1/1823 |

(Continued)

*Primary Examiner* — Jason S Daniels
(74) *Attorney, Agent, or Firm* — Fitch, Even Tabin & Flannery LLP

(57) ABSTRACT

A vehicle construction having a displaceable top between a closed-top position and a cleared position and that has, in a rear portion of the top, a rigid top part element extending in the transverse direction of the vehicle and being movable, a rear pillar on each of the two sides in relation a vertical longitudinal center plane of the vehicle as well as a rear window that can be displaced between a closed position, in which it closes a vehicle tail opening, and an open position, in which the tail opening is cleared at least partially. A circumferential sealing system that is in contact with the rear pillars and against the rigid top part in the closed position of the rear window, in relation to the vehicle environment from the inside, is linked to the rear window in a permanent fashion.

12 Claims, 12 Drawing Sheets

(56) References Cited

U.S. PATENT DOCUMENTS

| | | | | |
|---|---|---|---|---|
| 9,370,989 | B2* | 6/2016 | De Smet | B60J 1/007 |
| 9,475,364 | B2* | 10/2016 | Tooker | B60J 1/1853 |
| 10,220,689 | B2* | 3/2019 | Sviberg | B60J 7/061 |
| 2005/0035624 | A1* | 2/2005 | Krohle | B60J 7/146 |
| | | | | 296/107.07 |
| 2007/0262610 | A1* | 11/2007 | Bunsmann | B60J 1/1823 |
| | | | | 296/146.16 |
| 2009/0102229 | A1* | 4/2009 | Wiechowski | B60J 1/1823 |
| | | | | 296/121 |
| 2015/0224860 | A1* | 8/2015 | Bowles | B60R 21/13 |
| | | | | 296/218 |
| 2016/0167496 | A1* | 6/2016 | Sviberg | B60J 7/061 |
| | | | | 296/107.07 |
| 2019/0241053 | A1* | 8/2019 | Desai | B60J 5/105 |

* cited by examiner

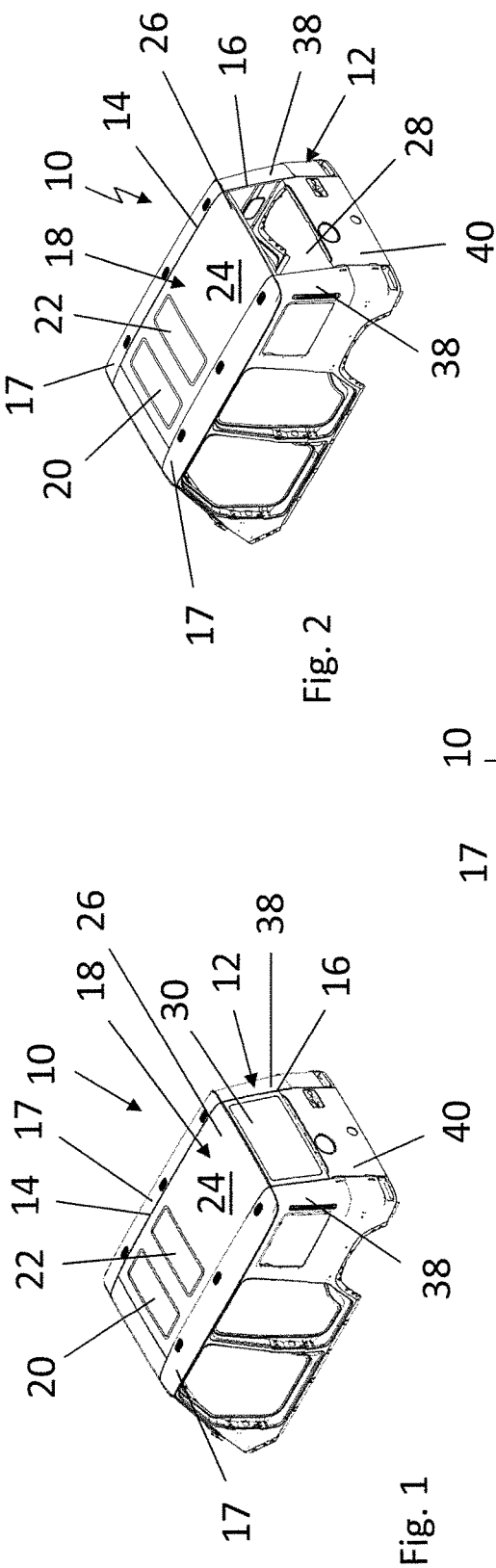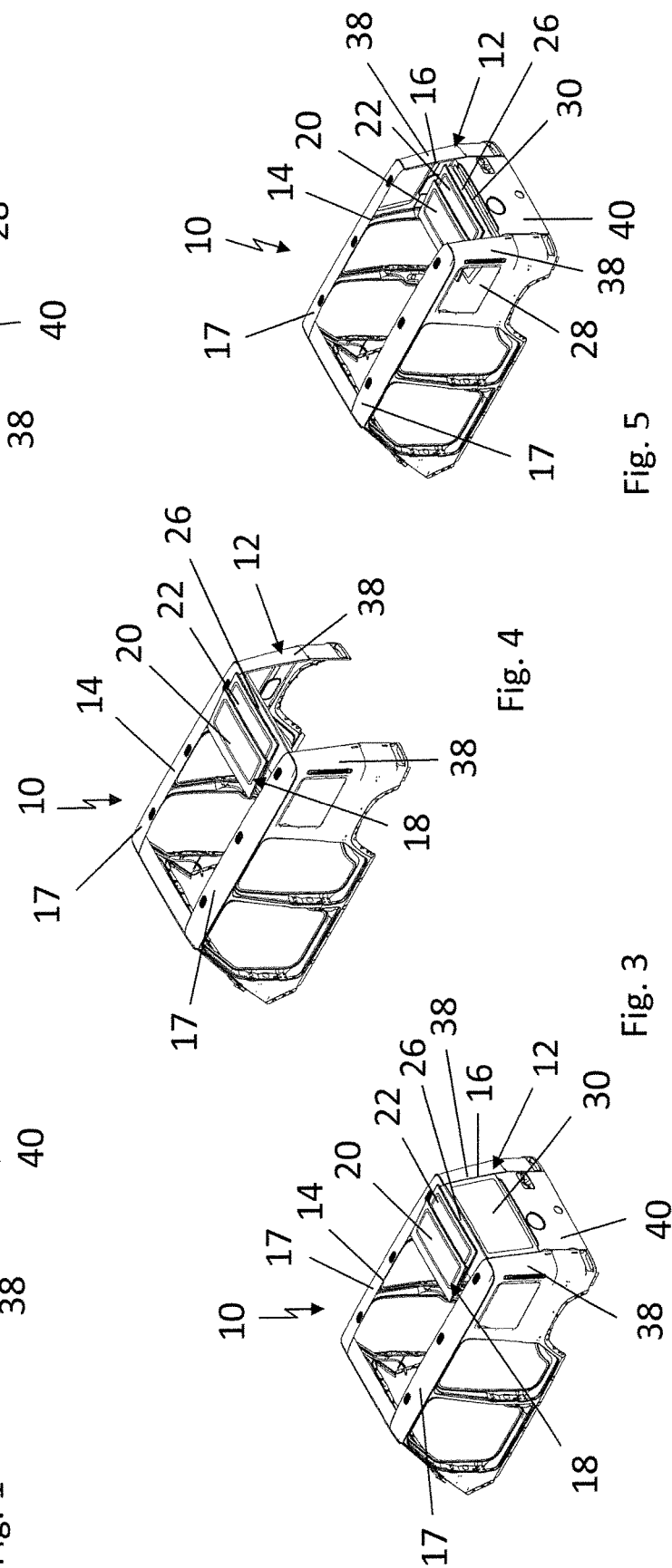

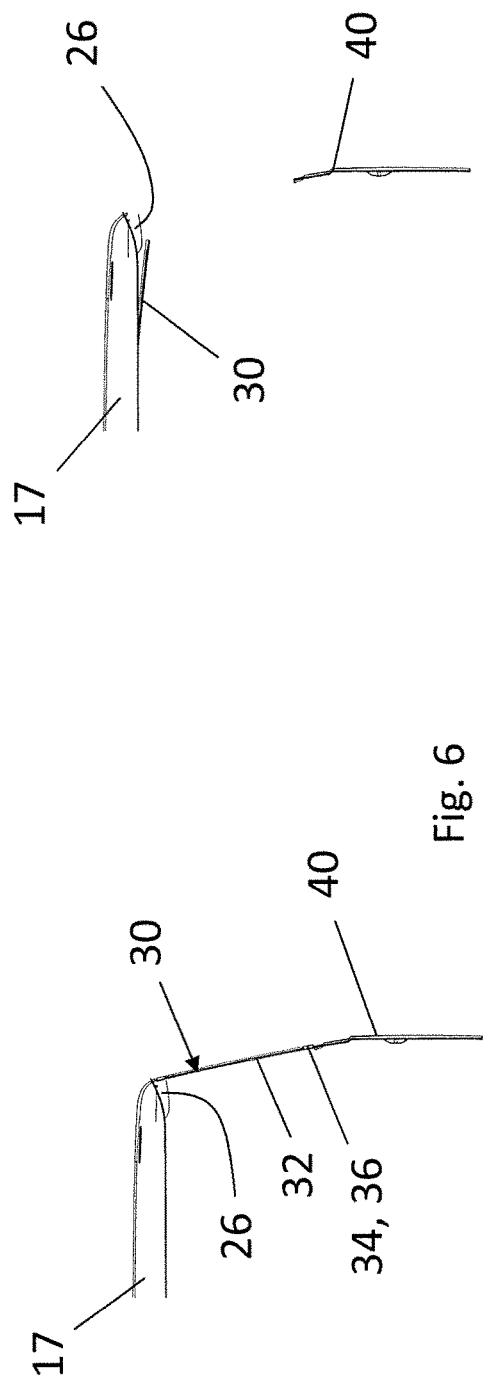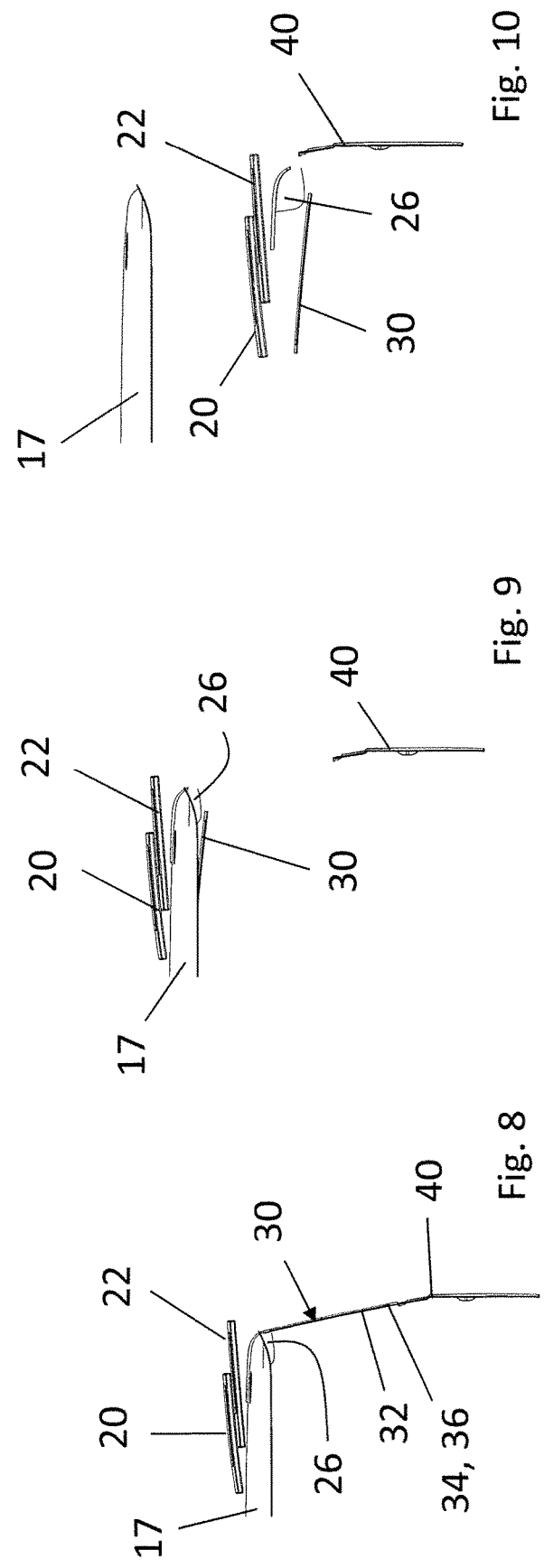

VEHICLE CONSTRUCTION HAVING A RIGID TOP ELEMENT AND A REAR WINDOW THAT CAN BE OPENED

CROSS-REFERENCE TO RELATED APPLICATIONS

This application claims priority from German Patent Application Number DE 10 2017 129 415.5, filed Dec. 11, 2017, and German Patent Application Number DE 10 2018 117 521.3, filed Jul. 19, 2018, which are both hereby incorporated herein by reference in their entirety for all purposes.

FIELD

The invention relates to a vehicle construction having the features of the preamble of claim 1.

BACKGROUND

Such a vehicle construction is known from practice and comprises a vehicle body in which a roof opening is realized that can be closed using a top or be cleared by displacing the top into a storage position. The top comprises a top cloth and, as a rigid top element, for example a rear top cassette, which assumes a lifted position in the closed position of the top and a lowered position in the storage position of the top. Additionally, the vehicle body includes a rear pillar on each of the two sides in relation to a vertical longitudinal center plane of the top that extends in the vertical direction of the vehicle and limits a tail opening laterally. A rear window can be integrated into the top cloth. The rear window can be displaced between a closed position and an open position together with the top cloth. In the closed position, the tail opening is closed.

SUMMARY

It is the object of the invention to create a vehicle construction of the kind referred to in the introduction, said construction permitting the rear window to have the largest possible dimensions so that a maximum viewing region can be made available in the closed position of the rear window and that a vehicle interior can easily be accessed when the tail opening is cleared.

In accordance with the invention, this object is attained through the vehicle construction having the features of claim 1.

Thus, a vehicle construction is proposed, having a top that can be displaced between a closed-top position for spanning a vehicle interior and a cleared position for clearing the vehicle interior to the top and that comprises, in the rear, a top element extending in the transverse direction of the vehicle and being movable and rigid. The vehicle construction has a rear pillar on each of the two sides in relation to a vertical longitudinal center plane of the vehicle as well as a rear window that can be displaced between a closed position, in which it closes a vehicle tail opening, and an open position, in which the tail opening is cleared at least partially. A circumferential sealing system is linked to the rear window in a permanent fashion, said sealing system being in contact with the rear pillars and against the rigid top part in the closed position of the rear window, in relation to the vehicle environment from the inside.

Due to the inventive design of the rear window with the circumferential sealing system that is linked thereto in a permanent fashion, the rear window can close the vehicle tail opening that is realized between the rear pillars arranged on both sides without any further movable bridging components parts. This means that, for closing the vehicle tail opening, no top fabric strip or the like is required. The entire rear region and the entire vehicle tail opening respectively can be closed using the rear window alone having the circumferential sealing system that is linked thereto. The rigid top element and the rear pillars form sealing surfaces to the inside, with which the sealing system that is linked to the rear window in a permanent fashion can be brought into contact from the inside.

The vehicle construction according to the invention can furthermore include a tailgate or rear door that limits the vehicle tail opening in the bottom. The tailgate or rear door, in the upper edge region at its inner side and/or at its upper edge, then also forms a sealing surface with which the rear window, in the closed position, is in contact from the inside and/or from above with its circumferential sealing system. Consequently, a completely sealed ring is formed by the sealing system and the corresponding sealing surfaces, said sealing surfaces, with which the sealing system, which is in particular completely circumferential, is in contact, lying against the sides of the relevant vehicle elements facing the vehicle interior. A profile element of the sealing system that is realized as a sealing bubble or sealing tube hence lies at a side of the rear window facing the outer side of the vehicle.

In a preferred embodiment of the vehicle construction according to the invention, the rigid top part is a rear top cassette that can be displaced between a lifted position and a lowered position and that extends, in the lifted position, in particular between roof lateral beams that are arranged on both sides, said rear window, which assumes its lifted position, in its open position being pivoted to the top into a vehicle interior and against the top cassette. This embodiment makes an unobstructed access to the vehicle interior through the vehicle tail opening possible in the open position of the rear window. The rear window, which is then in its open position or loading position, does not constitute an element obstructing the access here.

In order to further improve the accessibility of the vehicle interior through the vehicle tail opening, the rear window, in a special embodiment of the vehicle construction according to the invention, has an at least nearly horizontal orientation in its open position.

In a special embodiment of the vehicle construction according to the invention, the rear window, when lowering the rigid top element into the lowered position, in relation to the vehicle construction to the inside and downwards is pivoted about a pivot axis, which is arranged in a lower edge region of the rear window.

It is also conceivable to design the vehicle construction according to the invention such that the rear window, which in its open position is pivoted to the top and to the inside, can be lowered, from its open position, into the lowered position or storage position together with the rear top part.

If the top of the vehicle construction according to the invention comprises a foldable top fabric or top cloth, the rear window can preferably be displaced between the closed position and the open position without being linked to the top fabric. This means that, relating to the top fabric, the rear window is embodied without being linked.

In order to be able to displace the rear window between its closed position and its open position, it is, in a preferred embodiment of the vehicle construction according to the invention, in relation to a vertical longitudinal center plane of the vehicle, linked to a multi-arm hinge mechanism on each of its two sides. The multi-arm hinge mechanism can be linked to main kinematics for the rear rigid top part and/or to a respective vehicle-attached main bearing. The rear window is in particular displaced between the closed position and the open position using a separate drive motor, but it can also be displaced, in a corresponding design, using a drive motor that drives the main kinematics of the rear rigid top part.

It is conceivable that the vehicle construction includes a rail system in which the rear window is guided when being displaced between the closed position and the open position.

In order to realize the link of the sealing system to the rear window, the rear window can be provided with a circumferential plastics frame which is foamed or extruded onto said rear window and to which the sealing system is fastened, in particular being plugged thereon. Depending on the size of the windowpane, metal inserts can be integrated into the plastics frame that is realized as an edge injection molded section or as a foam section molded to the edge, said metal inserts stabilizing or stiffening the construction of the rear window arrangement.

Furthermore, pivot bearings for the multi-arm hinge mechanism are integrated into the plastics frame, preferably in the form of insert parts, using which pivot bearings the rear window can be displaced. The pivot bearings define centers of rotation or hinge points for links of the multi-arm hinge mechanism.

The multi-arm hinge mechanism is preferably designed in such a way that both the displacing movement of the rear window between the closed position and the open position and a storage movement of the rear window are guided when the rigid top element is being lowered.

If the top element is a top cassette, which is part of a folding top, it can accommodate a drive that serves for actuating the top fabric or top cloth and bows for spanning the top cloth. In the open position of the rear window, the folding top can be closed, partially opened or also completely opened.

Further advantages and advantageous configurations of the subject-matter of the invention can be taken from the description, from the drawing and from the claims.

In the drawing, an exemplary embodiment of the subject-matter of the invention is illustrated in a schematically simplified fashion and will be explained in more detail in the following description.

BRIEF DESCRIPTIONS OF THE DRAWING

FIG. 1 shows a perspective top view onto a vehicle construction having a top and a rear window in their respective closed position;

FIG. 2 shows a view of the vehicle construction that is similar to FIG. 1, but in an open position of the rear window;

Figure 11:
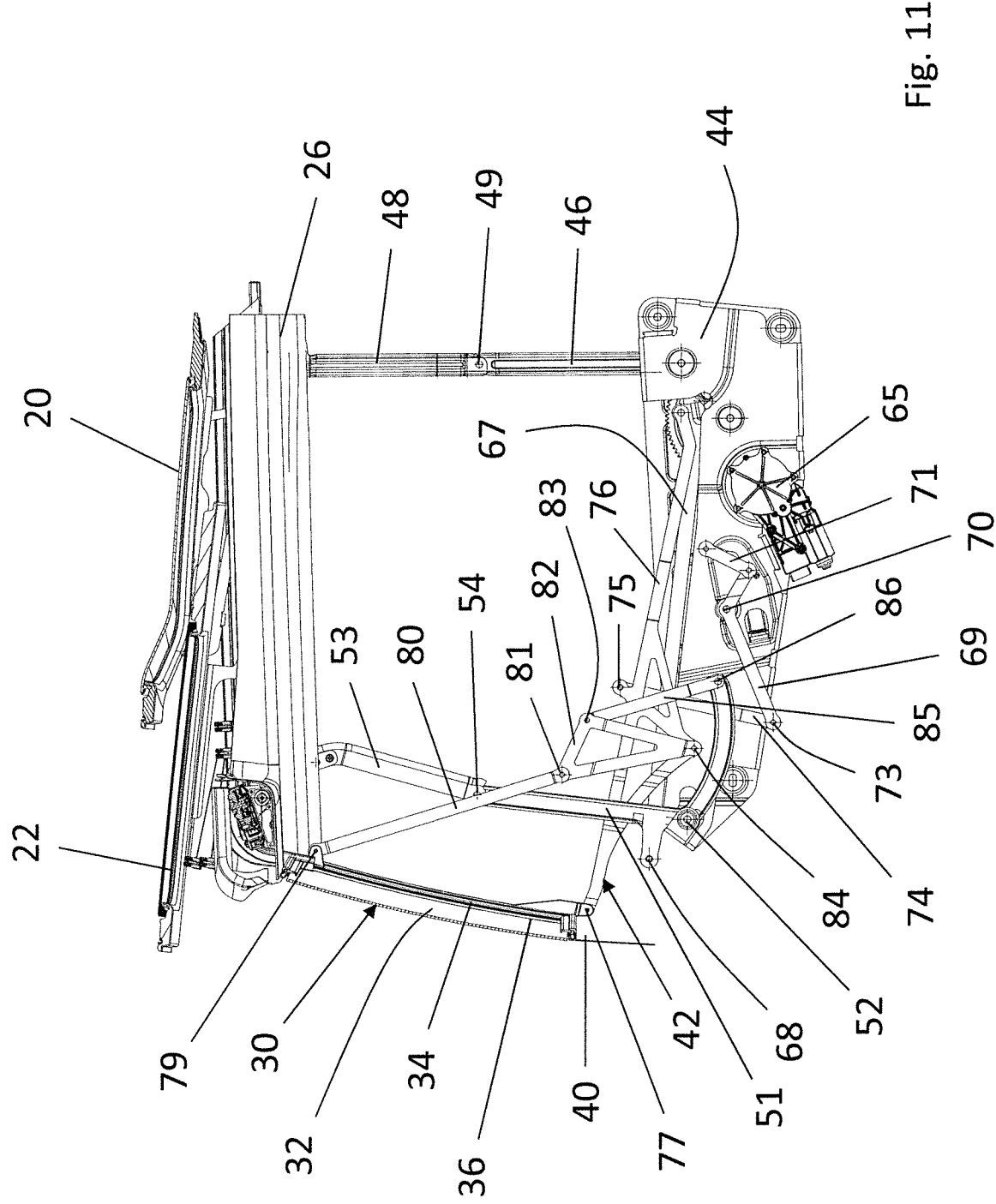
Figure 12:
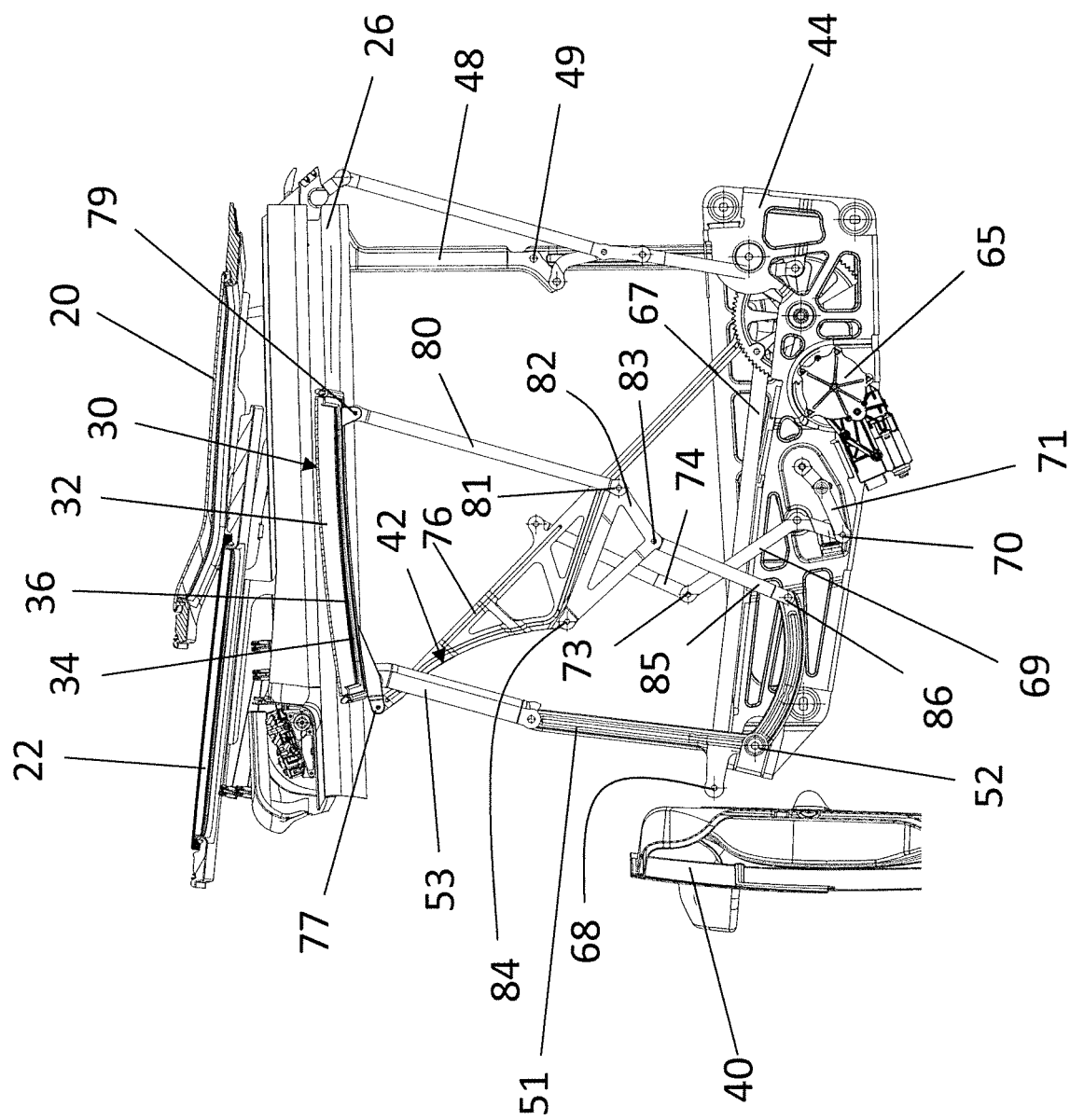
Figure 13:
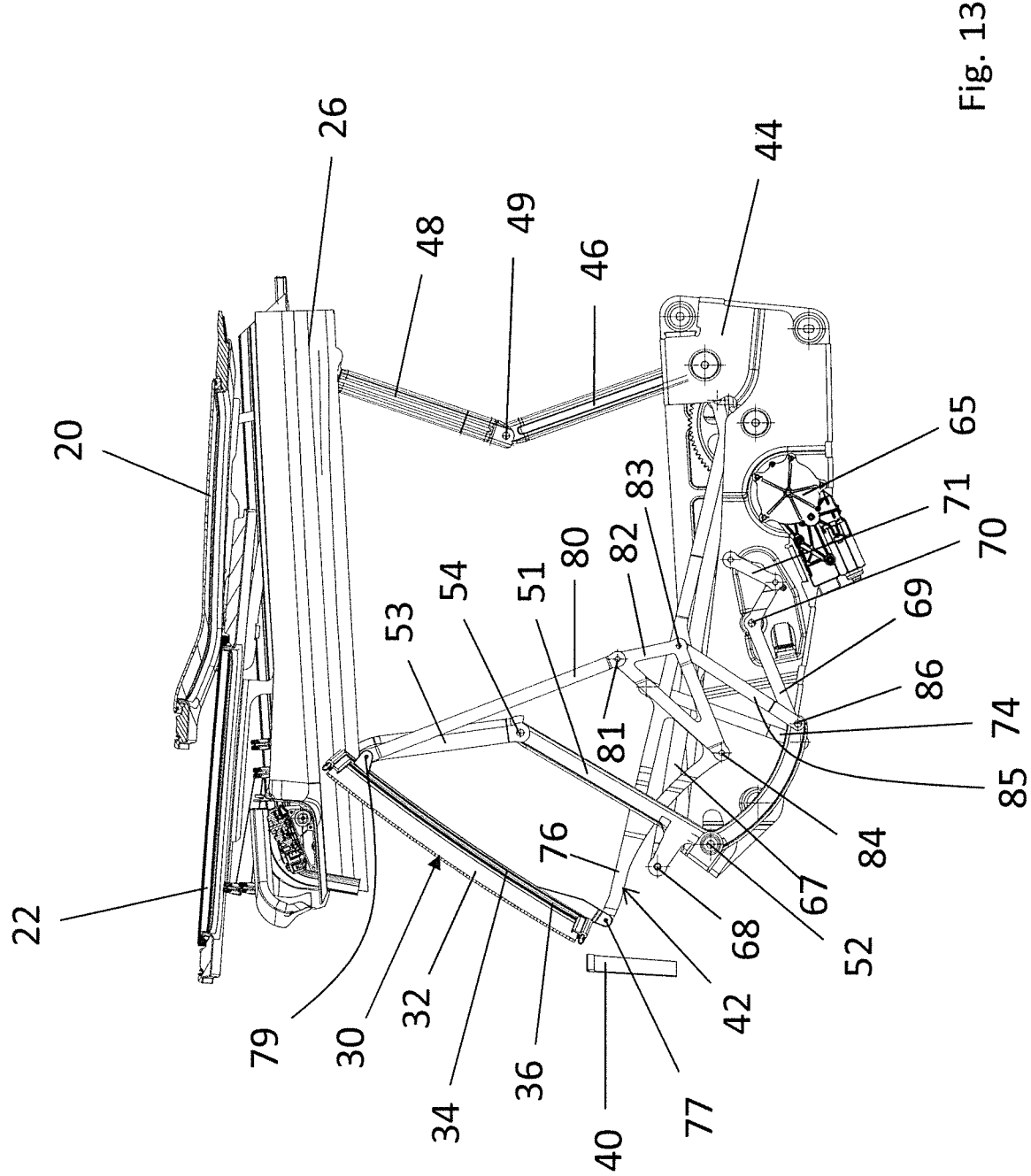
Figure 14:
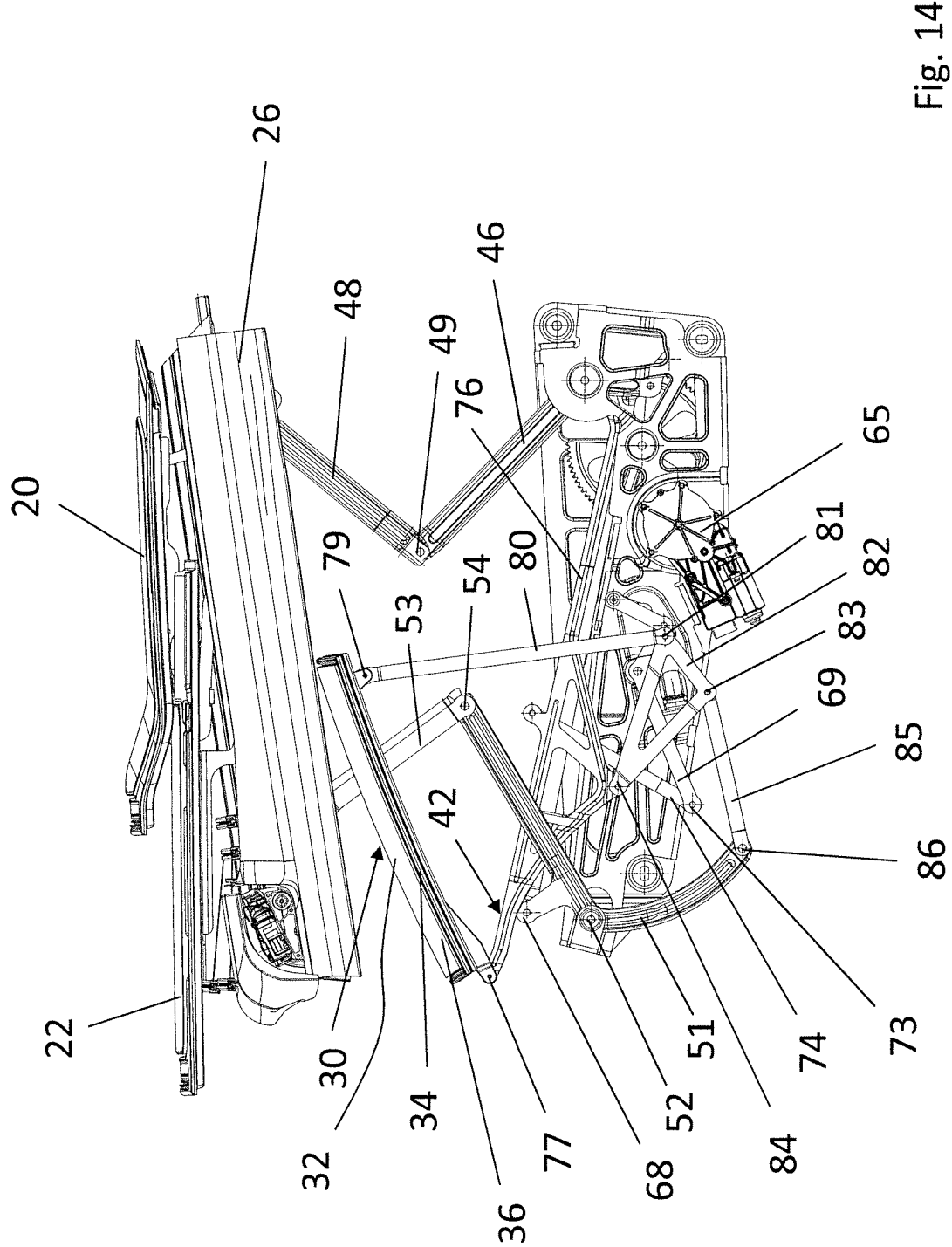
Figure 15:
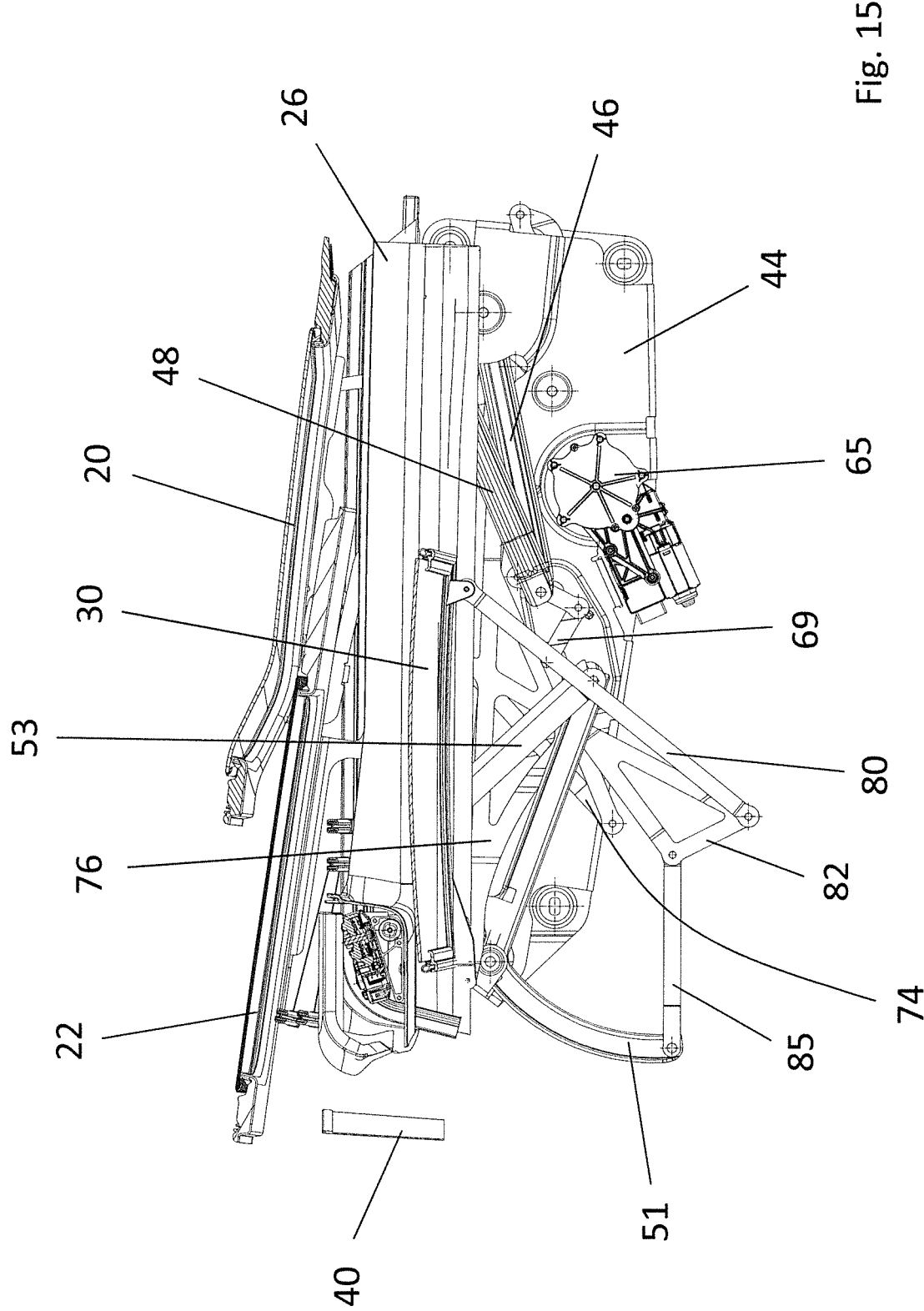
Figure 17:
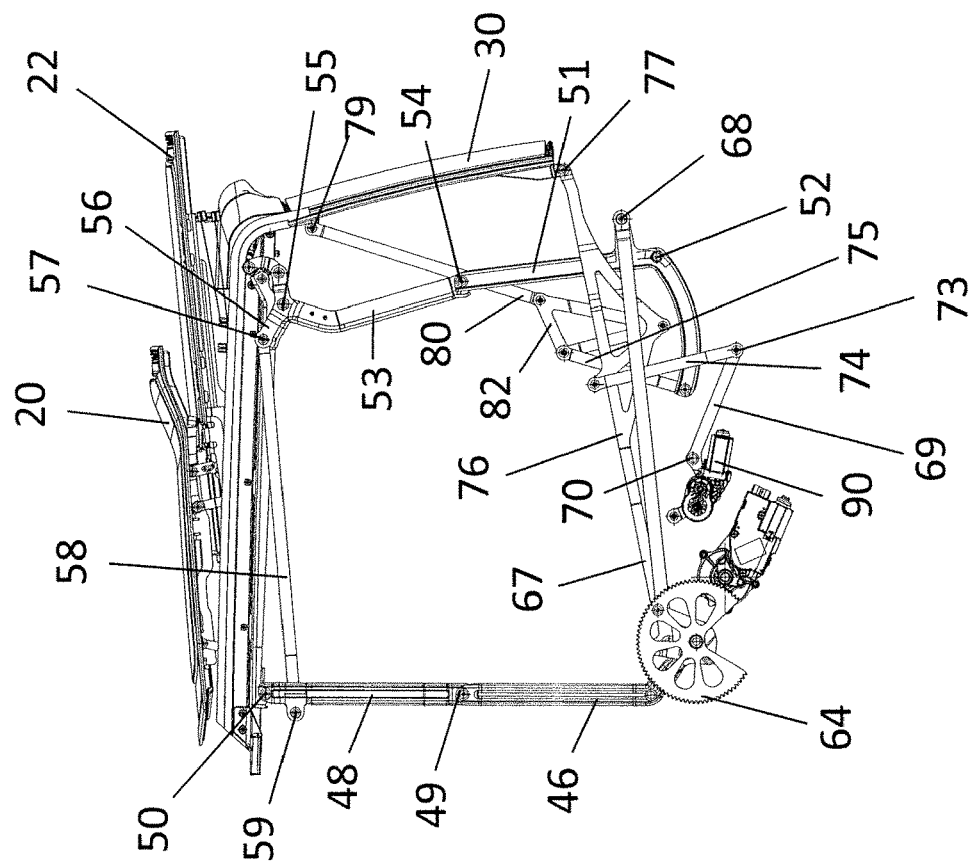
Figure 16:
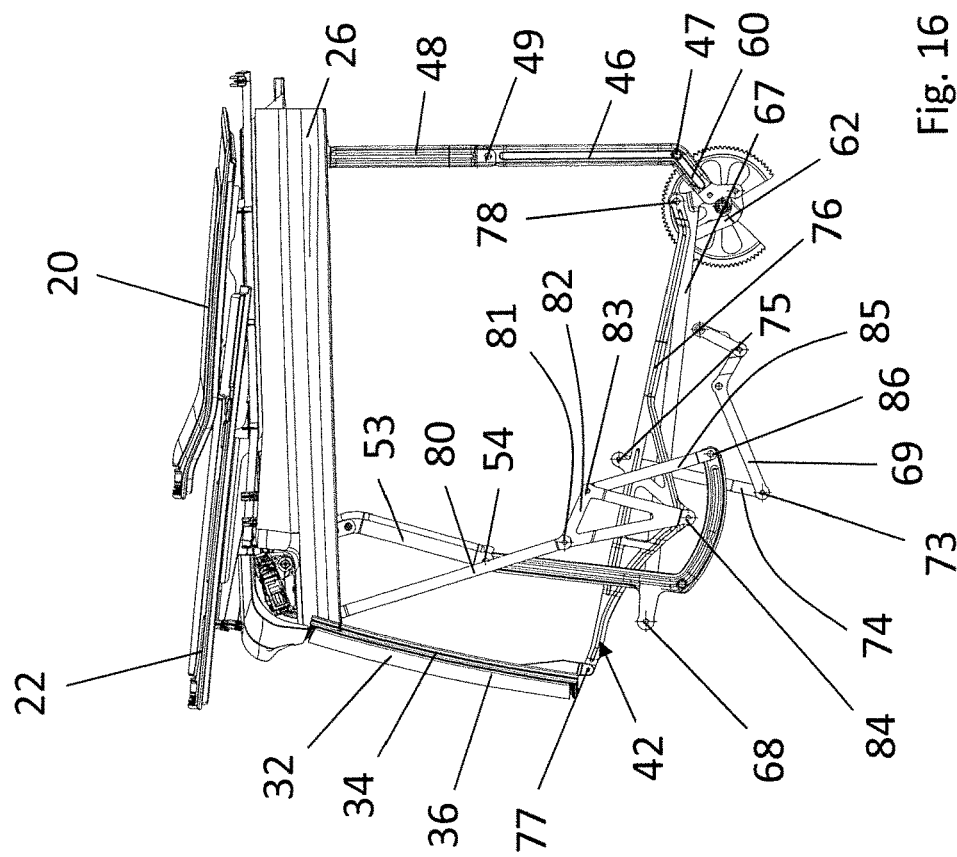
Figure 19:
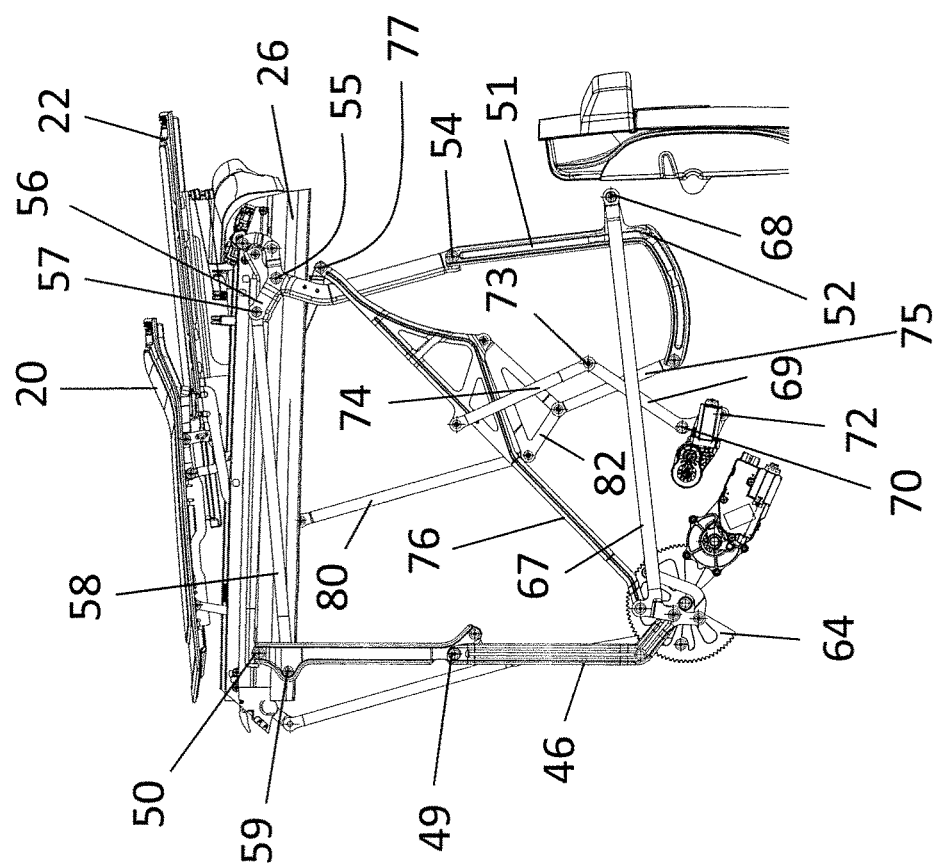
Figure 18:
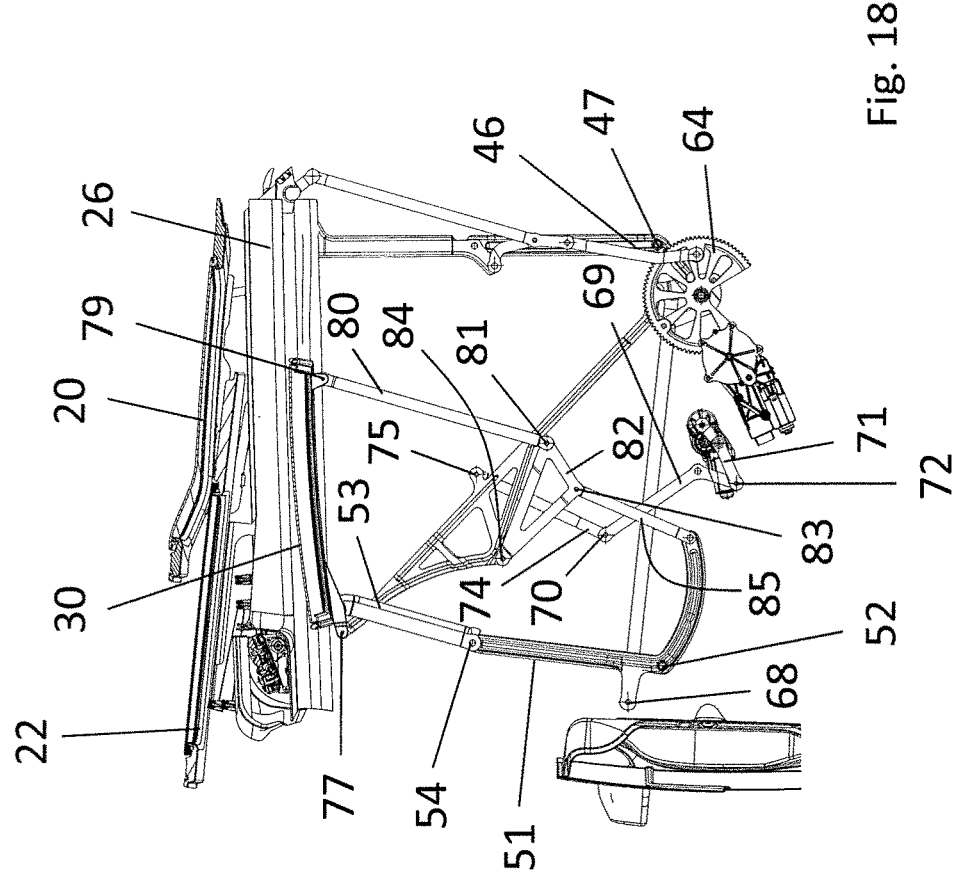
Figure 21:
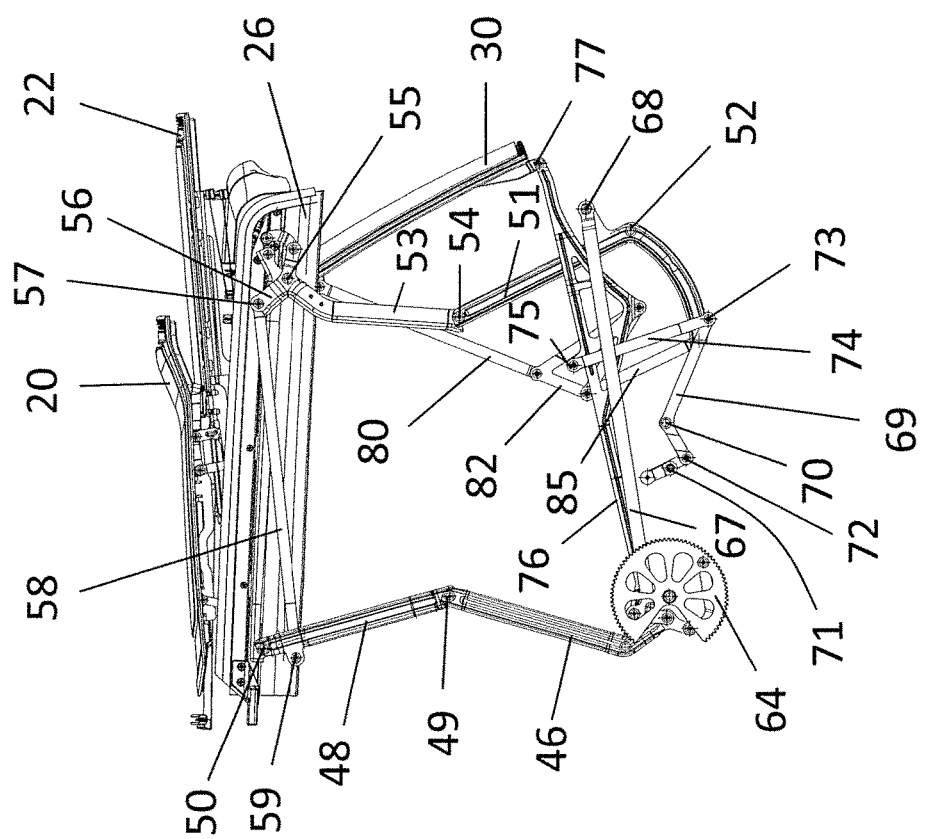
Figure 20:
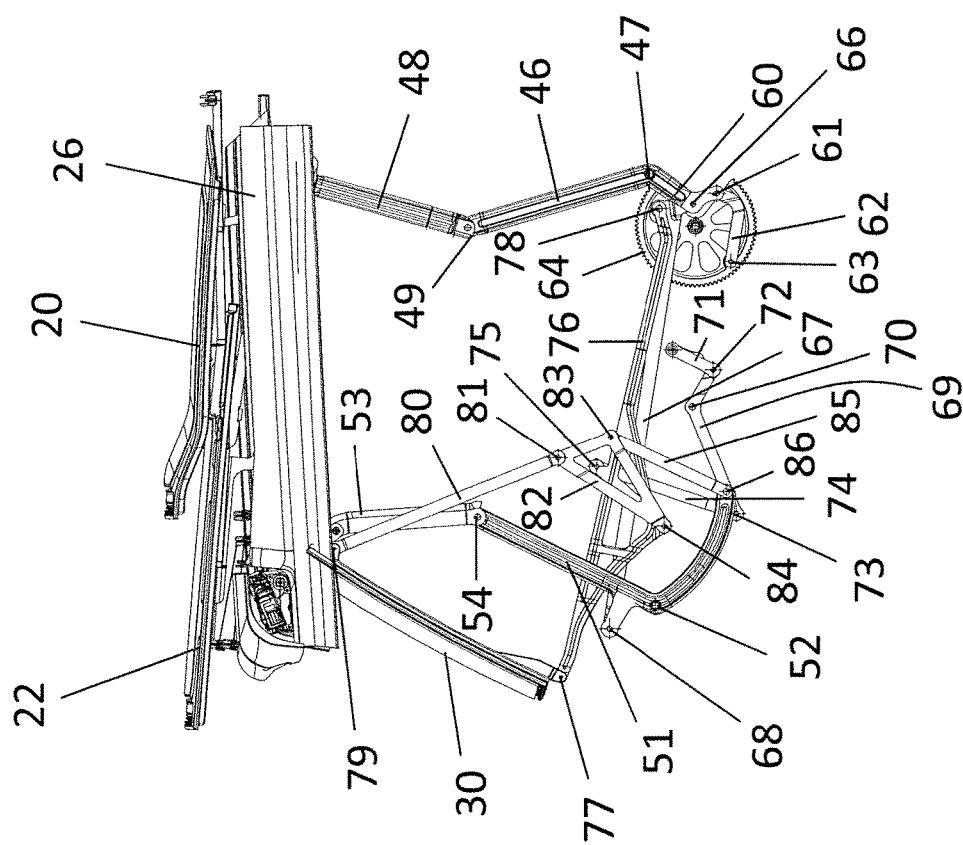
Figure 23:
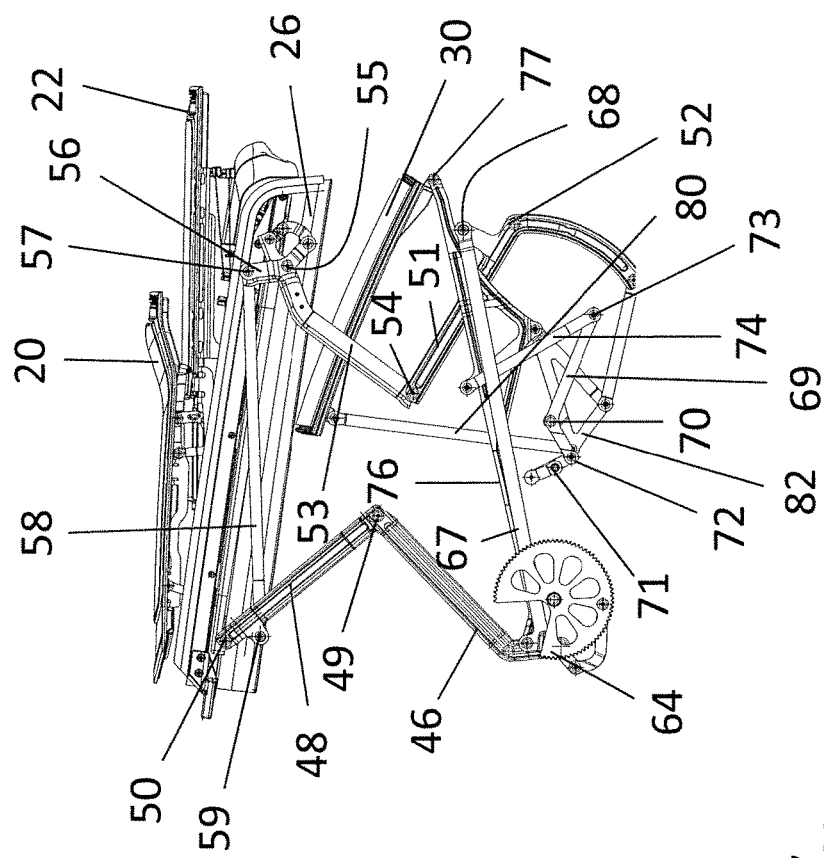
Figure 22:
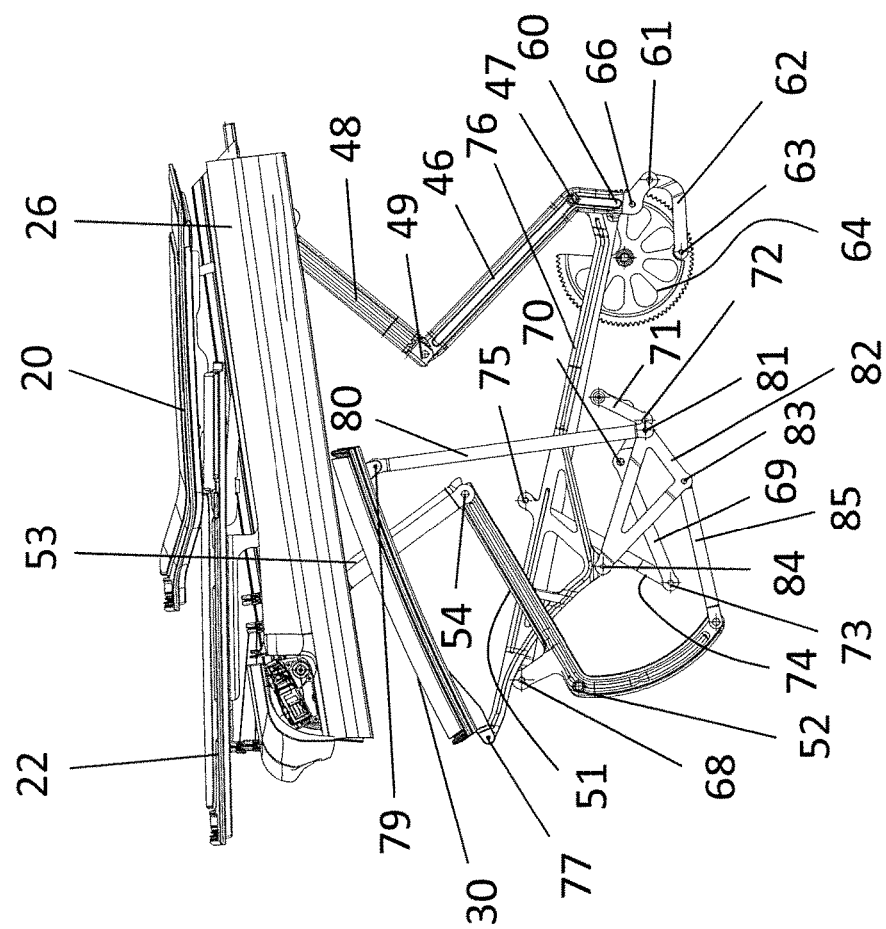
Figure 24:
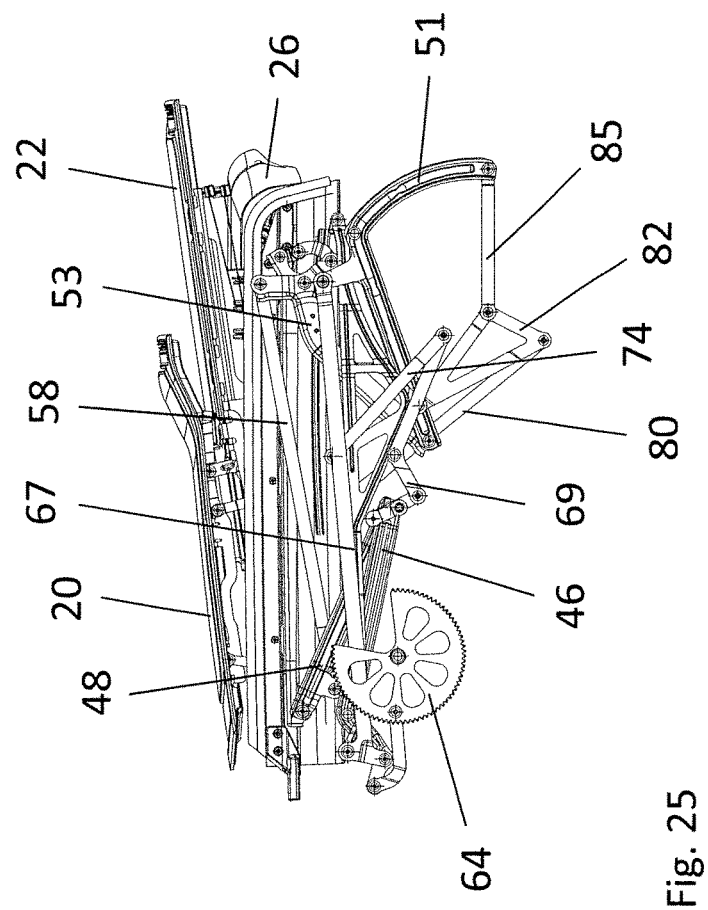
Figure 25:
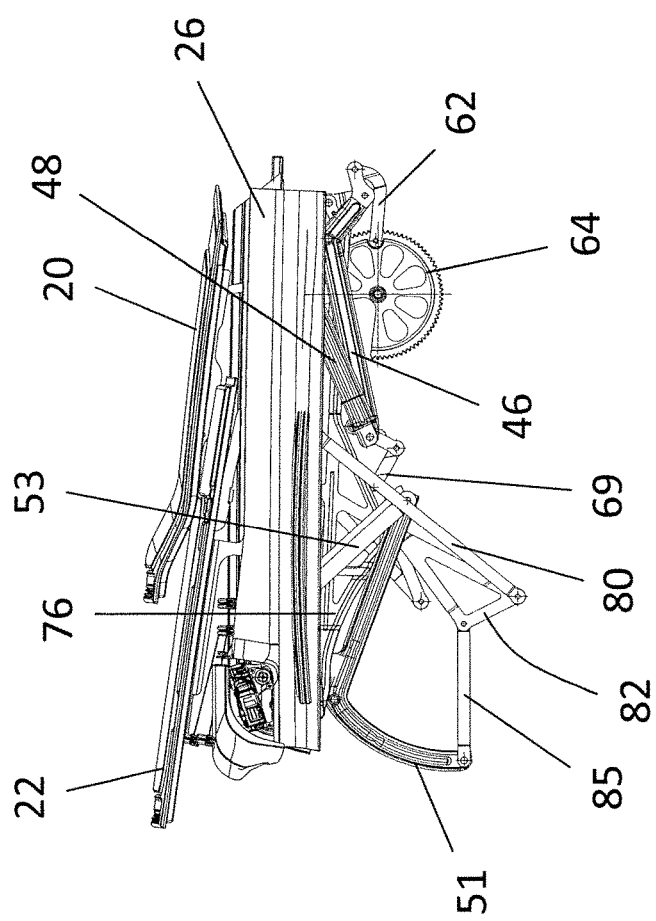

FIG. 3 also shows a view of the vehicle construction that is similar to FIG. 1, but in an open position of the top and in a closed position of the rear window;

FIG. 4 also shows a view of the vehicle construction that is similar to FIG. 1, but in the open position of the top and in the open position of the rear window;

FIG. 5 also shows a view of the vehicle construction that is similar to FIG. 1, but with a top that has been opened and lowered;

FIG. 6 shows a schematized side view of a rear region of the vehicle construction according to FIG. 1 in the closed position of the top and of the rear window;

FIG. 7 shows a view of the rear region of the vehicle construction that is similar to FIG. 6, but in the open position of the rear window;

FIG. 8 also shows a view of the rear region of the vehicle construction that is similar to FIG. 6, but in the open position of the top;

FIG. 9 also shows a view of the rear region of the vehicle construction that is similar to FIG. 6, but in the open positions of the top and of the rear window;

FIG. 10 also shows a view of the rear region of the vehicle construction that is similar to FIG. 6, but in the open and lowered position of the top;

FIG. 11 shows a side view of kinematics of the rear window and of the top in the closed position of the rear window and in the open position of the top;

FIG. 12 shows a view of the kinematics that is similar to FIG. 11, but in the open position of the rear window;

FIG. 13 shows a view of the kinematics that is similar to FIG. 11, but in a first intermediate position while the top is being lowered;

FIG. 14 shows view of the kinematics that is similar to FIG. 11, but in a second intermediate position while the top is being lowered;

FIG. 15 also shows a view of the kinematics that is similar to FIG. 11, but in the lowered position of the top;

FIG. 16 shows a side view of the kinematics that is similar to FIG. 11, but without showing a main bearing;

FIG. 17 shows a second side view of the kinematics in the open position of the top and in the closed position of the rear window;

FIG. 18 shows a view of the kinematics that is similar to FIG. 16, but with a rear window that is open;

FIG. 19 shows a side view that is similar to FIG. 17, but with a rear window that is open;

FIG. 20 shows a view of the kinematics that is similar to FIG. 16, but in the first intermediate position while the top is being lowered;

FIG. 21 shows a side view of the kinematics that is similar to FIG. 17, but in the first intermediate position while the top is being lowered;

FIG. 22 shows a side view of the kinematics that is similar to FIG. 16, but in the second intermediate position while the top is being lowered;

FIG. 23 shows a side view of the kinematics that is similar to FIG. 17, but in the second intermediate position while the top is being lowered;

FIG. 24 shows a side view of the kinematics that is similar to FIG. 16, but in the lowered position of the top; and FIG. 25 shows a side view of the kinematics that is similar to FIG. 17 in the lowered position of the top.

DETAILED DESCRIPTION

In FIGS. 1 to 10, a motor vehicle 10 is illustrated, which is realized as an all-terrain vehicle or as a so-called SUV (Sport Utility Vehicle) and which includes a vehicle construction having a vehicle body 12, which is provided with a roof opening 14 and with a tail opening 16. As it can be taken from FIG. 5, the roof opening 14 merges into the tail opening 16.

For clearing or closing, as desired, the roof opening 14 that is limited by roof lateral beams 17, the motor vehicle 10 is provided with a roof opening system 18 that constitutes a top or a folding top and comprises two rigid lid elements 20 and 22, which are realized in the manner of sliding lids, and which are each provided with a transparent viewing region. The lid elements 20 and 22, outside of the viewing region, are spanned in the manner of panel bows by a top cloth 24, which, in the closed position of the lid elements 20 and 22, forms a folding roof portion in the rear of lid element 22 and extends up to a rear top cassette 26, said top cassette constituting a rigid top element that extends in the transverse direction of the vehicle. The top cassette 26, which accommodates a drive for the lid elements 20 and 22 and the folding roof portion, can be lowered, together with the top cloth 24 and the lid elements 20 and 22 in their open position, from a lifted position, which is illustrated in FIGS. 1 to 4 and 6 to 9, into a lowered position, which is illustrated in FIGS. 5 and 10, and can be stored in a rear storage space 28 of the vehicle construction.

The tail opening 16, using a rear window 30, can be closed (FIGS. 1 and 6) or cleared (FIGS. 2, 4, 7 and 9) as desired. While the rear window 30 is being displaced from the closed position, which is illustrated in FIGS. 1 and 6, into the open position, which is illustrated in FIGS. 2, 4, 7 and 9, the rear window 30 is pivoted forward and to the top into the vehicle interior against the top cassette 26, then having an at least nearly horizontal orientation. This means that a loading auxiliary function is provided.

The rear window 30 comprises a transparent glass pane 32 that is provided with a foam section molded to the frame 34, which runs around the entire glass pane, and which forms a plastics frame at which a completely circumferential sealing system 36 is arranged. In the closed position that is illustrated in FIGS. 1, 3, 6 and 8, the sealing system 36, in relation to the vehicle body 12 from the inside, is in contact with corresponding sealing surfaces, which are realized on the inner side on the side facing the vehicle interior, at the lateral edges of so-called D-pillars 38 or rear pillars of the vehicle body 12, said D-pillars limiting the tail opening 16 laterally. Additionally, with its upper leg, the sealing system 36, from the inside, is in contact with a sealing surface that is realized inside at the rear edge of the top cassette 26 that forms a rigid top part. Furthermore, with its lower leg, the completely circumferential sealing system 36, from the inside, is in contact with a sealing surface that is realized inside at the upper edge of a tailgate 40 of the vehicle body 12. There is no connection between the top cloth 24 and the rear window 30.

A drive for actuating the roof opening system 18 is arranged in the top cassette 26. Using said drive, the two lid elements 20 and 22 can be moved, together with the top cloth 24, over the top cassette 26 like fish scales (cf. FIGS. 3, 4, 8 and 9), so that the entity that is made up of the lid elements 20 and 22, of the top cloth 24 and of the top cassette 26 can be lowered into a storage position (FIGS. 5 and 10).

Kinematics for driving the rear window 30 and for driving the top cassette 26 are illustrated in more detail in FIGS. 11 to 25.

The kinematics for displacing the rear window 30 and the top cassette 26 are realized in a mirror-symmetrical fashion in relation to a vertical longitudinal center plane of the vehicle and comprise a link arrangement 42 on each of their two sides, said link arrangements being pivotably borne at a vehicle-attached main bearing 44. For reasons of clarity, only the link arrangement 42 that is arranged on the right in relation to the forward direction of travel of the vehicle 10 is illustrated in the drawing and will be described in the following. The link arrangement that is arranged on the left in relation to the forward direction of travel of the vehicle 10 follows along these lines.

Each of the link arrangements 42 comprises, for displacing the top cassette 26, a front articulated lever arrangement that is made up a lower link 46, which is pivotably borne at the main bearing 44 in a hinge point 47, and of an upper link 48, which is connected to the lower link 46 via a hinge point 49 and is articulated to the top cassette 26 in a hinge point 50. Additionally, each of the link arrangements 42 includes a rear articulated lever arrangement, which is formed from a lower L-shaped link 51, which is borne at the main bearing 44 in a hinge point 52, and from an upper link 53, which is connected to the lower link 51 via a hinge point 54 in an articulated manner and is pivotably articulated to the top cassette 26 in a hinge point 55. Additionally, the upper link 53 includes an extension 56 at the side of hinge point 55 facing away from the lower link 51, a hinge point 57 being realized at said extension, in which hinge point 57 a connecting rod 58 is articulated. Said connecting rod 58 is articulated, with its end facing away from hinge point 57, is articulated to the upper link 48 of the front articulated lever arrangement in a hinge point 59.

The lower link 46 of the front articulated lever arrangement has, on the side of hinge point 47 that is facing away from hinge point 49, a drive end 60, to which a reduction gearing link 62 is articulated via a hinge point 61, said reduction gearing link 62 being connected to a drive wheel 64 via a hinge point 63. The drive wheel 64 is driven by a drive motor 65, using which the displacing movement of the top cassette 26 can be triggered.

In the region of the drive end 60, a coupling rod 67 is articulated to the lower link 46 of the front articulated lever arrangement via a hinge point 66, said coupling rod 67 being articulated, with its other end, in a hinge point 68, to an extension of the lower link 51 of the rear articulated lever arrangement.

For driving the rear window 30, each of the link arrangements 42 includes a drive link 69, which is in particular bent or angled, and which is pivotably borne at the main bearing 44 in a hinge point 70 and can be actuated using a link 71, which is articulated in a hinge point 72 and is driven by a second drive motor 90, which is illustrated in FIG. 17. The drive link 69, via a hinge point 73, is connected to a control link 74, which is articulated to a rear window link 76 in a hinge point 75. Said rear window link 76 is on the one hand articulated in a hinge point 77 in the lower edge region of the rear window 30 and is on the other hand articulated to the coupling rod 67 in a hinge point 78 in the region of the drive wheel 64.

In the upper edge region of the rear window 30, a guide link 80 is articulated via a hinge point 79, said guide link 80 being articulated, with its end that is facing away from hinge point 79, to a knee link 82 via a hinge point 81. The knee link 82, aside from hinge point 81, includes a hinge point 83 and a hinge point 84. In hinge point 84, the knee link 82 is supported at a lower extension of the rear window link 76. In hinge point 83, the knee link 82 is connected to a support link 85, which is articulated, in a hinge point 86, to a leg of the L-shaped lower link 51 of the rear articulated lever arrangement.

The kinematics that have previously been described for the top cassette 26 and the rear window 30 function in the manner being described in the following.

If the rear window 30 is supposed to be moved out of its closed position, which is illustrated in FIG. 11, into the open position, which is illustrated in FIG. 12, the drive motor 90 is actuated so that the drive link 69, in relation to the arrangement illustrated in FIG. 11, is clockwise pivoted about hinge point 70. Hereby, a force is exerted on the rear window link 76 via the control link 74 so that said rear window link 76 is pivoted about hinge point 78, clockwise as well. Thereby, as it can be taken from FIGS. 12, 18 and 19, the rear window 30 is pivoted to the top and forward to a position under the top cassette 26 and the rear window 16 is cleared. Simultaneously, the knee link 82 is pivoted at the rear window link 76 in hinge point 84 so that the guide link 80, which is supported at the held lower link 51 of the rear articulated lever arrangement via the knee link 82 and the support link 85, can go along with the displacing movement of the rear window 30 or pulls the upper edge of the rear window 30 downwards. The rear window 30 is displaced into the closed position in a manner that is correspondingly inverted.

If, in contrast, the top cassette 26 is supposed to be lowered from the lifted position, which is illustrated in FIG. 11, into the storage position, which is illustrated in FIG. 15, the drive motor 65 is actuated, whereas the drive motor 90 is stationary so that the drive link 69 is blocked. The drive wheel 64 is twisted counterclockwise, in relation to the illustration chosen in FIG. 16, for this displacing movement of the top cassette 26 so that a drive force is exerted on the lower link 46 of the front articulated lever arrangement via the reduction gearing link 62, said lower link 46 being pivoted about hinge point 47 counterclockwise. Thereby, a displacing force is introduced into the lower link 51 of the rear articulated lever arrangement via the coupling rod 67, whereby said lower link 51 is clockwise rotated about the main bearing-attached hinge point 52. The two articulated lever arrangements thereby crumple so that the upper links 48 and 53, which are coupled to each other via the connecting rod 58, are brought to rest on the lower links 46 and 51 of the articulated lever arrangements. Hereby, via the support link 85, which is articulated to a leg of the lower link 51 of the rear articulated lever arrangement, a tractive force is exerted on the knee link 82 and consequently on the guide link 80. The knee link 82 thus rotates about hinge point 84 at the rear window link 76, whereby the rear window 30, as it can be taken from FIGS. 20 and 25, is also brought to rest, that means is clockwise pivoted forward about hinge point 77 at the rear window link 76 in relation to FIG. 20.

LIST OF REFERENCE NUMERALS 10 motor vehicle
12 vehicle body
14 roof opening
16 tail opening
17 roof lateral beams
18 roof opening system
20 lid element
22 lid element
24 top cloth
26 top cassette
28 storage space
30 rear window
32 glass pane
34 foam section molded to the frame
36 sealing system
38 D-pillar
40 tailgate
42 link arrangement
44 main bearing
46 lower link
47 hinge point
48 upper link
49 hinge point
50 hinge point
51 lower link
52 hinge point
53 upper link
54 hinge point
55 hinge point
56 extension
57 hinge point
58 connecting rod
59 hinge point
60 drive end
61 hinge point
62 reduction gearing link
63 hinge point
64 drive wheel
65 drive motor
66 hinge point
67 coupling rod
68 hinge point
69 drive link
70 hinge point
71 link
72 hinge point
73 hinge point
74 control link
75 hinge point
76 rear window link
77 hinge point
78 hinge point
79 hinge point
80 guide link
81 hinge point
82 knee link
83 hinge point
84 hinge point
85 support link
86 hinge point
90 drive motor

The invention claimed is:

1. A vehicle construction, comprising:
a top that can be displaced between a closed-top position for spanning a vehicle interior and a cleared position for clearing the vehicle interior to the top and that comprises, in a rear portion of the top, a rigid top part element extending in a transverse direction of the vehicle and being movable,
a rear pillar on each of two sides in relation a vertical longitudinal center plane of the vehicle as well as a rear window that can be displaced between a closed position, in which it closes a vehicle tail opening, and an open position, in which the tail opening is cleared at least partially, wherein a circumferential sealing system that is in contact with the rear pillars and against the rigid top part in the closed position of the rear window, on a side facing the vehicle interior, is linked to the rear window in a permanent fashion.

2. The vehicle construction according to claim 1, wherein the rear window, in its open position, has an at least nearly horizontal orientation.

3. The vehicle construction according to claim 1, wherein the top comprises a foldable top cloth at a portion of the top located at any location in a forward direction with respect to the rigid top part element and in that the rear window can be displaced between the closed position and the open position without being linked to the top cloth.

4. The vehicle construction according to claim 1, wherein the rear window, in relation to the vertical longitudinal center plane of the vehicle, is linked to a multi-arm hinge mechanism on each of its two sides, using which it can be displaced between the closed position and the open position.

5. The vehicle construction according to claim 4, wherein the multi-arm hinge mechanism is linked to main kinematics for the rear top part and/or to a vehicle-attached main bearing.

6. The vehicle construction according to claim 1, wherein a rail system for displacing the rear window between the closed position and the open position is provided.

7. The vehicle construction according to claim 1, wherein the rear window is provided with a circumferential plastics frame which is foamed or extruded onto the rear window and to which the sealing system is fastened, in particular being plugged thereon.

8. The vehicle construction according to claim 7, wherein a water channel is realized between the sealing system and the plastics frame at least in some regions.

9. The vehicle construction according to claim 7, wherein pivot bearings for a multi-arm hinge mechanism are integrated into a plastics frame.

10. The vehicle construction according to claim 1, wherein a tailgate or rear door is provided, with which the rear window is in contact in its closed position from the inside via the sealing system.

11. A vehicle construction, comprising:
a top that can be displaced between a closed-top position for spanning a vehicle interior and a cleared position for clearing the vehicle interior to the top and
that comprises, in a rear portion of the top, a rigid top part element extending in a transverse direction of the vehicle and being movable,
a rear pillar on each of two sides in relation a vertical longitudinal center plane of the vehicle as well as a rear window that can be displaced between a closed position, in which it closes a vehicle tail opening, and an open position, in which the tail opening is cleared at least partially, wherein a circumferential sealing system that is in contact with the rear pillars and against the rigid top part in the closed position of the rear window, is linked to the rear window in a permanent fashion; and wherein the rigid top part is a rear top cassette that can be displaced between a lifted position and a lowered position and that extends, in the lifted position, in particular between roof lateral beams that are arranged on both sides, and in that the rear window, in its open position, is pivoted to the top into the vehicle interior and against the top cassette, which assumes its lifted position.

12. A vehicle construction, comprising:
a top that can be displaced between a closed-top position for spanning a vehicle interior and a cleared position for clearing the vehicle interior to the top and
that comprises, in a rear portion of the top, a rigid top part element extending in a transverse direction of the vehicle and being movable,
a rear pillar on each of two sides in relation a vertical longitudinal center plane of the vehicle as well as a rear window that can be displaced between a closed position, in which it closes a vehicle tail opening, and an open position, in which the tail opening is cleared at least partially, wherein a circumferential sealing system that is in contact with the rear pillars and against the rigid top part in the closed position of the rear window, is linked to the rear window in a permanent fashion; and wherein the rear window can be lowered, from its open position, into a storage position together with the rear top part.

* * * * *